United States Patent
Crawford, Jr. et al.

(10) Patent No.: US 6,233,572 B1
(45) Date of Patent: May 15, 2001

(54) COMPUTER IMPLEMENTED SYSTEM AND METHOD FOR HIGH LEVEL CONTROLLED SEARCHING THROUGH A PROBLEM SPACE

(75) Inventors: James M. Crawford, Jr., Flower Mound; Brian M. Kennedy, Coppell; Tiaohua Lin, Flower Mound; Narayan Venkatasubramanyan, Coppell; Arun Kunchithapatham, Irving, all of TX (US); Karel Zeithammer, Tervuren (BE)

(73) Assignee: i2 Technologies, Inc., Irving, TX (US)

( * ) Notice: Subject to any disclaimer, the term of this patent is extended or adjusted under 35 U.S.C. 154(b) by 0 days.

(21) Appl. No.: 09/322,430

(22) Filed: May 28, 1999

Related U.S. Application Data

(60) Provisional application No. 60/086,994, filed on May 28, 1998.

(51) Int. Cl.[7] .................................................. G06F 17/30
(52) U.S. Cl. ........................................ 707/3; 707/2; 707/5
(58) Field of Search .............................. 707/1, 3, 2, 101, 707/5; 395/500.34; 705/8

(56) References Cited

U.S. PATENT DOCUMENTS

| | | | |
|---|---|---|---|
| 5,737,728 | 4/1998 | Sisley et al. | 705/8 |
| 5,946,481 | * 8/1999 | Kurshan et al. | 395/500.34 |

FOREIGN PATENT DOCUMENTS

| | | |
|---|---|---|
| 0 425 404 A2 | 5/1991 | (EP) . |
| 2 302 425 | 1/1997 | (GB) . |

OTHER PUBLICATIONS

IBM Technical Disclosure Bulletin, "Adaptive Context–Dependent Decision Making", IBM Corporation, Mar. 1987, vol. 29, Issue No. 10, p. No. 4468–4471.*

Kawaji et al., "Solving the nonlinear dynamic control problems by GA with structuring the search space", IEEE, 1995, pp. 151–156.*

Luger et al., "Artificial Intelligence and the Design of Expert Systems", The Benjamin/Cummings Publishing Company, Inc, pp. 77–147, 1989.*

Mark S. Fox and Stephen F. Smith, ISIS—A Knowledge–Based System For Factory Scheduling, XP–000748117, vol. 1, No. 1, Jul. 1, 1984, pp. 25–49.

* cited by examiner

*Primary Examiner*—Wayne Amsbury
*Assistant Examiner*—Thuy Pardo
(74) *Attorney, Agent, or Firm*—Baker Botts L.L.P.

(57) ABSTRACT

A system and method for searching a problem space. In an exemplary application, the search constructs a plan associated with a business enterprise and the problem space is a model of the enterprise. The search is divided into subsearches. Each subsearch is performed by a subsearch process having its own goal data, termination data, problem data, problem selection process, move process, and script. The script of a subsearch determines whether the current state of the search shall be advanced by a move of that subsearch or by another subsearch.

26 Claims, 1 Drawing Sheet

COMPUTER IMPLEMENTED SYSTEM AND METHOD FOR HIGH LEVEL CONTROLLED SEARCHING THROUGH A PROBLEM SPACE

RELATED PATENT APPLICATION

This application claims the benefit of U.S. Provisional Application No. 60/086,994, filed May 28, 1998 and entitled "Computer Implemented System and Method for High Level Controlled Searching Through a Problem Space".

TECHNICAL FIELD OF THE INVENTION

This invention relates in general to the fields of supply chain management, and single- and multi-enterprise planning. More particularly, the present invention relates to a computer implemented system and method for high level controlled searching through a problem space.

BACKGROUND OF THE INVENTION

Computer implemented planning systems are widely used for factory, enterprise and supply chain planning functions. In general, the systems model the manufacturing environment and provide plans for producing items to fulfill consumer demand within the constraints of the environment.

A classic artificial intelligence search can include elements such as: an initial state, a goal state, a termination criteria, and a set of moves between states of the search space. For example, in a "blocks world" problem space, an artificial intelligence search engine could have an initial state of a red block and blue block on a table and a yellow block on top of the blue block. A goal state for such an engine could be the goal of building a planned sequence of moves which place the red block on top of the blue block. The termination criteria could be to achieve the goal within 10 minutes or quit. The set of moves could comprise: moving an uncovered block onto the table and moving an uncovered block from the table onto another uncovered block. An artificial intelligence search process, then, could compute a plan for the required moves to achieve the goal. When applied to planning problems, the number of "blocks" greatly increases, and the initial and goal states become more complex.

With more "blocks" and/or more complex initial and goal states, this type of search can be computationally challenging. Further complexity can be added to a system when the types and numbers of moves grow.

SUMMARY OF THE INVENTION

In accordance with the present invention, a computer implemented system and method for high level controlled searching through a problem space is disclosed that provides significant advantages over previously developed searching mechanisms.

According to one aspect of the present invention, the system can include a plurality of subsearch processes, wherein each subsearch process can comprise: a goal function, a termination criteria, a problem subset, a problem selection algorithm, a move subset, a lower subsearch set, and a script. The problem subset can be an identified flaw, infeasibility, or suboptimal condition in a given system. The problem selection algorithm is operable to select a targeted problem from the problem subset. The move subset is a set of functions or operations operable to optimize the current subsearch. The lower subsearch set is a set of one or more "downstream" subsearches. The script is operable to specify or determine the appropriate moves or subsearches to execute.

It is a technical advantage that the invention can allow convenient expression of complex divide-and-conquer type searches.

It is another technical advantage that the invention allows for combined automated and manual searches, as well as potentially other types of searches.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
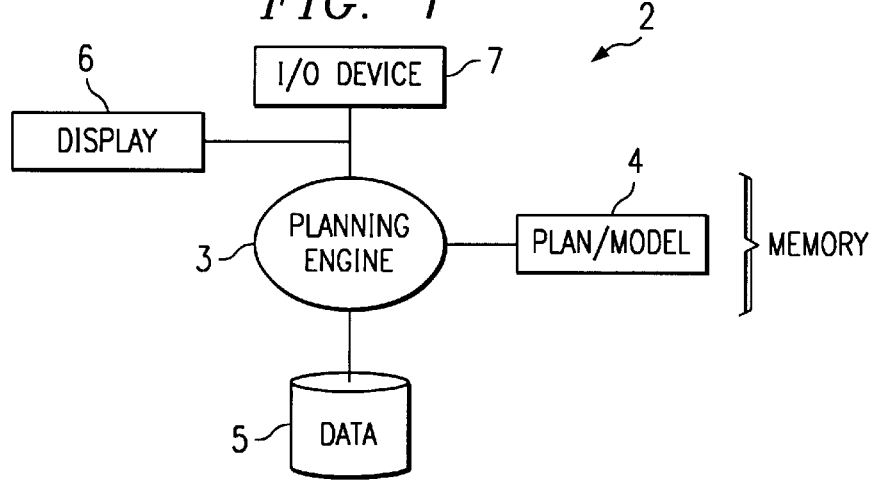
FIG. 1 is a block diagram of a planning system that provides a mechanism for high level controlled searching through a problem space.

FIG. 1 is a block diagram of a planning system, indicated generally at 2, that provides a mechanism for high level controlled searching through a problem space according to the present invention. Planning system 2 can be implemented on a computer system having typical computer components such as a processor, memory, storage devices, etc. In the embodiment of FIG. 1, planning system 2 executes software that implements a planning engine 3 in processor memory. Planning engine 3 maintains and accesses a plan/model 4 representing, for example a manufacturing environment or supply chain which planning engine 3 is used to plan. Planning engine 3 has access to data 5 stored in a fixed storage device. Data 5 can be used to initiate planning engine 3 and plan/model 4. However, during operation, planning engine 3 and plan/model 4 are typically maintained in processor memory for speed and efficiency. Planning engine 3 can provide information to a user via display 6 and can receive input data from input devices 7. In the embodiment of FIG. 1, planning engine 3 can execute the method of the current invention. Plan/model 4 and data 5 can comprise the problem space upon which planning engine 3 operates. Planning engine 3 can execute the subsearch process as depicted in FIG. 2.

Figure 2:
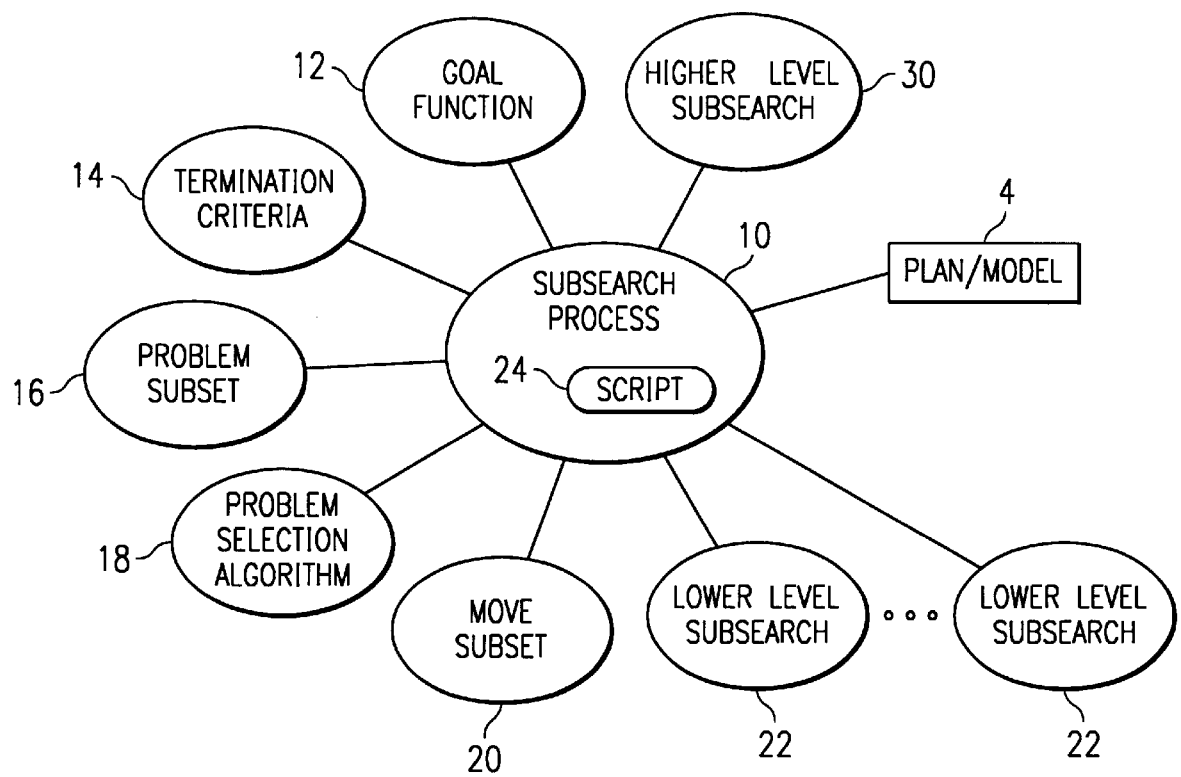
FIG. 2 is a block diagram of one embodiment of a subsearch process for high level controlled searching through a problem space according to the present invention.

FIG. 2 is a block diagram of one embodiment of a subsearch process for high level controlled searching through a problem space according to the present invention. Searching through the problem space can be achieved through the use of multiple subsearch processes 10, each comprising: a goal function 12, a termination criteria 14, a problem subset 16, a problem selection algorithm 18, a move subset 20, possible lower subsearches 22, and a script 24. Subsearch process 10 is operable to modify the model/plan 4. Problem subset 16 can include a set of problems, where, for example, a problem is an identified flaw, constraint, infeasibility, or suboptimal condition in the current search state. Problem selection algorithm 18 can include a method of selecting the next problem from the problem subset 16 to attack. Move subset 20 can include operations or moves that are operable to transform the current search state into a better one. Script 24 is operable to specify when to execute lower level subsearches 22 or a move from move subset 20. Higher level subsearch 30 of FIG. 2 illustrates that a plurality of subsearch processes 10 can be nested.

In operation, typically, an overall search could be modeled as a subsearch process 10 having neither a move subset 20 (or moves of its own) nor a higher level subsearch 30. Such an overall search could delegate the moves to lower level subsearches 22 and order the lower level subsearches 22 in a beneficial manner. Additionally, the present invention contemplates a scenario where lower level subsearches 22 can be viewed as "high level moves." Individual moves of move subset 20 and lower level subsearches 22 can then be ordered together in the same script 24.

One embodiment of the present invention allows for the combination of automated and manual searching mechanisms. Subsearch processes can be useful, for example, in manufacturing planning and scheduling applications, where user-intervention is critical. One such example can be the planning of overtime shifts. For instance, a human user (rather than the scheduling system) will often be in charge of planning overtime shifts. It is possible for a subsearch mechanism to take the user to a plan state in which orders are all delivered "on time" but under infeasible machine capacity conditions—thus necessitating further subsearching. The subsearch process could include the components of TABLE 1.

TABLE 1 a goal function that specifies on time deliveries;
a termination criteria of "no more late delivery problems";
a problem subset consisting of all problems whose resolution will not cause late delivery, this problem subset can exclude problems such as "machine capacity exceeded" or "material started before current time";
a problem selection algorithm which rates problems by latency and randomly selects a problem based upon the rating;
a move subset of search space moves which are operable to avoid or eliminate late delivery problems; and
no lower level subsearches.

For example, with respect to the move subset, a move such as "move task back in time" could help resolve late delivery problems, but a move such as "move task forward in time" could sometimes cause delivery problems.

In operation, a user could run this subsearch process, check machine capacities, and perhaps run some other subsearches which might resolve machine capacities. The user could then rerun this subsearch, schedule any necessary overtime shifts, and then run other subsearches to achieve a good plan under that overtime schedule. It is a technical advantage that the subsearch mechanism can provide users with several reasoning tools that are unavailable with other search mechanisms. It is another technical advantage of the present invention that searches with automated and manual features can be combined.

A further aspect of the present invention can provide for an entirely automated search mechanism. For example, in an automated embodiment, a script could comprise the flow of TABLE 2.

TABLE 2 first run subsearch #1
then run subsearch #2
then run subsearch #3.

Such an embodiment can implement a classic divide-and-conquer search strategy for dividing a slow-to-solve search into a series of fast-to-solve subsearches.

Such scripts can be implemented with a number of characteristics. One characteristic is that a script can comprise a logical flow as shown in TABLE 3.

TABLE 3 loop until termination condition is met, doing:
{
if any machine's capacity in any given week exceeds 120%, run overtime_shift_subsearch
else
select a subsearch randomly, weighted by priority numbers, and run the search for one problem resolution
}
}

Another characteristic of a script is that it can direct a subsearch process to run a series of subsearches and then terminate. In such an embodiment, each subsearch can loop and attack (or apply moves from an associated move subset to) problems from an associated problem subset until the subsearch's termination criteria is met.

Further, a script can operate to direct a subsearch to run a series of subsearches repeatedly. The subsearch process could loop back and rerun the subsearches repeatedly until each subsearch has met its associated goal function, until a termination criteria is met, or upon manual termination.

Another characteristic is a script can operate to direct a subsearch process to run a series of subsearches repeatedly. The subsearch process can loop and look for a subsearch with an associated goal function that has not been met and that has resolvable problems. If no such subsearch is found, the subsearch process can terminate. Otherwise, the subsearch process can run a single subsearch to attack one problem. Such an embodiment could terminate upon timeout or manual intervention.

A script can also operate to direct a subsearch process to loop until timeout or manual termination. During each loop, the subsearch process can select subsearches randomly weighted by a measure of how much work it will take to resolve problems associated with each subsearches. Each selected subsearch can be allowed to attack one of its associated problems.

A further aspect of a script is that it can offer one or more "hook" points for running lower level subsearches. For example, in pseudocode, the script could include the flow of TABLE 4.

TABLE 4 loop
{
  execute a designated "before search" subsearch.
  for heat = max_annealing_heat to
    min_annealing_heat by annealing_steps
  {
  resolve one of our own problems using our own moves.
  execute a designated "after resolve" subsearch.
    terminate if timeout or manual termination.
  }
  execute a designated "after search" subsearch.
}

Alternatively, the annealing loop in the embodiment could be replaced with a user-supplied termination criteria.

A number of high level computer languages can be appropriate for expressing scripts. However, it can be desirable to integrate the language with the search engine. In such an embodiment, greater search control can be achieved as the amount of accessible state information is expanded.

A subsearch's subset of moves can contribute in several ways. For example, the subset can speed the search by focusing away from undesirable states (the problems the subsearch is working to eliminate). Additionally, a subsearch can help a user understand what has happened between subsearches. For example, in a subsearch which eliminates machine capacity problems, the user could see what happens if work is delayed (but never expedited). Alternatively, by changing the allowed moves, a user could see what happens if work is expedited (but never delayed). Bundling a subset of problems to work on and a subset of moves to do in that work gives the user a high level of control and insight into the overall search.

There are many possible algorithms for selecting the next problem to attack from among a subsearch's problem subset. While various specific selection algorithms can be used, the aspect of placing a problem selection algorithm in each subsearch can provide control over the overall search. For example, a top level subsearch could be organized as a sequence of three lower level subsearches, where the first subsearch deals with "big" problems, the second subsearch deals with "medium" problems, and the third subsearch deals with "small problems." "Problems" could mean any problem, a specific type of problem, problems at a specific point in the domain (such as a highly utilized factory machine). This organization can enable faster searching and be useful in situations that require manual intervention. For example, a user can solve the big problems, adjust the overtime schedule, and then re-execute the process to go back and solve the big problems the schedule adjustments created.

A further embodiment of the present invention can find an acceptable plan among various alternate plans. Alternate plans can arise in various cases such as when a given item can be assembled using any of several operations (each of which may process different raw parts). In pseudocode, the script of such an embodiment could include the flow of TABLE 5.

TABLE 5

```
for {the various alternate plans to try}
{ resolve (problem);
    run propagation_subsearch;
    run evaluation_subsearch;
    if evaluation_subsearch target achieved then quit;
    run cleanup_subsearch;
}
```

For example, such an embodiment can be useful in exploring alternate operations with the goal of assembling an item in a certain quantity. The propagation_subsearch can model a plan for a system to build that quantity of item and solve upstream problems that might occur based on that plan (such as the need to assemble items that go into this particular assembly operation). The evaluation_subsearch can evaluate the resultant plan, after running the propagation_subsearch, to ensure the resultant plan indeed builds the desired quantity. If so, the loop could be exited. Otherwise, the cleanup_subsearch could reset the plan so that the next alternate can be explored. For example, if propagation_subsearch built items upstream but fell short of the desired quantity, cleanup_subsearch can drive these quantity shortages downstream so that nothing is built downstream. Thus, the 'problem' can be restored, to be solved by the next alternate plan. By executing such scripts at various levels of the bill of materials, a user can achieve sophisticated search through combinations of alternate plans.

Another embodiment of the present invention can provide a general method of finding the best plan among various alternate plans. Such an embodiment can comprise a similar subsearch process as the previously discussed embodiment. However, rather than finding the first acceptable plan, the script can direct the subsearch process to explore all alternate plans and keep the best alternate. In pseudocode, the script of such an embodiment script comprises the flow as shown in TABLE 6.

TABLE 6

```
for {the various alternate plans to try}
{ set undo point;
    resolve (problem);
    run propagation_subsearch;
    run evaluation_subsearch;
    if evaluation_subsearch target achieved then quit;
    else if goal value of evaluation_subsearch best
        ever then remember this alternate plan;
    undo;
}
set plan to the best alternate
resolve (problem);
run propagation_subsearch;
```

With such an embodiment, an "undo point" can be set which allows the plan to be restored. This embodiment can run similar subsearches as executed in the immediately prior described embodiment and store a particular alternate if the alternate is the best alternate of those explored so far. The evaluation_subsearch target can narrow a search to a reasonable number of alternates or it could just return 'false' to have all alternates searched. After the search through alternates, the plan can be set to the best alternate encountered.

Although the present invention has been described in detail, it should be understood that various changes, substitutions and alterations can be made thereto without departing from the spirit and scope of the invention as defined by the appended claims.

What is claimed is:

1. A computer-implemented system for executing a search through a problem space, comprising:
    a search engine for controlling the execution of a plurality of subsearch processes available to be used in cooperation to perform the search;
    the plurality of subsearch processes, each comprising its own:
        goal data that specifies a goal of the subsearch;
        termination data that specifies one or more termination criteria for the subsearch;
        problem data that specifies one or more problems to be solved during the subsearch;
        problem selection process for selecting an ordering of the problems to be solved during the subsearch; and
        move process for executing one or more moves during the subsearch, each of which transforms a current search state into an improved search state; and
    a script that determines whether the search shall be advanced either by the move process of an executing subsearch process or by another of the subsearch processes.

2. The system of claim 1, wherein the move process of a first subsearch process identifies at least one of the moves of the first subsearch process as a second subsearch process.

3. The system of claim 1, further comprising a user interface in communication with the engine, the user interface operable to provide input from a user to the engine to specify one or more additional subsearch processes to be executed, the input being provided in response to a review by the user of the results of a previously-executed subsearch process.

4. The system of claim 1, wherein the script is operable to provide a fully automated search.

5. The system of claim 1, wherein the script is operable to cause a subsearch to call a move of another subsearch.

6. The system of claim 1, wherein each subsearch process further comprises its own:

propagation subsearch that provides results of one of a plurality of plans; and evaluation subsearch that evaluates the results.

7. The system of claim 1, wherein one or more of the subsearch processes are operable to start from an improved search state determined by a previously-executed subsearch process.

8. The system of claim 1, wherein multiple subsearches may be executed in sequence according to the script to achieve a goal of the search.

9. A computer-implemented system for modifying a plan modeled as part of an enterprise model, comprising:

a planning engine for controlling the execution of a plurality of subsearch processes available to be used in cooperation to modify the plan; and the plurality of subsearch processes, each comprising its own:

goal data that specifies a goal of the subsearch;

termination data that specifies one or more termination criteria for the subsearch;

problem data that specifies one or more problems to be solved during the subsearch;

problem selection process for selecting an ordering of the problems to be solved during the subsearch; and move process for executing one or more moves during the subsearch, each of which transforms a current search state into an improved search state; and a script that determines whether the search shall be advanced either by the move process of an executing subsearch process or by another of the subsearch processes.

10. The system of claim 9, wherein the move process of a first subsearch process identifies at least one of the moves of the first subsearch process as a second subsearch process.

11. The system of claim 9, further comprising a user interface in communication with the engine, the user interface operable to provide input from a user to the engine to specify one or more additional subsearch processes to be executed, the input being provided in response to a review by the user of the results of a previously-executed subsearch process.

12. The system of claim 9, wherein the script is operable to provide a fully automated search.

13. The system of claim 9, wherein the script is operable to cause a subsearch to call a move of another subsearch.

14. The system of claim 9, wherein each subsearch process further comprises its own:

propagation subsearch that provides plans; and evaluation subsearch that evaluates each of the plans.

15. The system of claim 9, wherein the problem data represents constraints of the enterprise model.

16. The system of claim 9, wherein one or more of the subsearch processes are operable to start from an improved search state determined by a previously-executed subsearch process.

17. The system of claim 9, wherein multiple subsearches may be executed in sequence according to the script to achieve a goal of the search.

18. A method of searching through a problem space, comprising the steps of:

using a search engine to control the execution of a plurality of subsearch processes available to be used in cooperation to perform the searching; and sharing searching tasks among the plurality of subsearch processes, each comprising its own:

goal data that specifies a goal of the subsearch;

ternination data that specifies one or more termination criteria for the subsearch;

problem data that specifies one or more problems to be solved during the subsearch;

problem selection process for selecting an ordering of the problems to be solved during the subsearch; and move process for executing one or more moves during the subsearch, each of which transforms a current search state into an improved search state; and a script that determines whether the search shall be advanced either by the move process of an executing subsearch process or by another of the subsearch processes.

19. The method of claim 18, wherein the move process of a first subsearch process identifies at least one of the moves of the first subsearch process as a second subsearch process.

20. The method of claim 18, further comprising the step of receiving input from a user via a user interface in communication with the engine, the input specifying one or more additional subsearch processes to be executed, the input being provided in response to a review by the user of the results of a previously-executed subsearch process.

21. The method of claim 18, wherein the script is operable to provide a filly automated search.

22. The method of claim 18, wherein the script is operable to cause a subsearch to call a move of another subsearch.

23. The method of claim 18, wherein each subsearch process further comprises its own:

propagation subsearch that provides results of a subsearch; and evaluation subsearch that evaluates the results.

24. The method of claim 18, wherein the search represents construction of a plan modeled as part of an enterprise model and wherein the problem space is the enterprise model.

25. The method of claim 18, wherein one or more of the subsearch processes are operable to start from an improved search state determined by a previously-executed subsearch process.

26. The system of claim 18, wherein multiple subsearches may be executed in sequence according to the script to achieve a goal of the search.

* * * * *